April 29, 1930. H. NISCHKE 1,756,521
CHAIN CONNECTER
Filed July 17, 1928
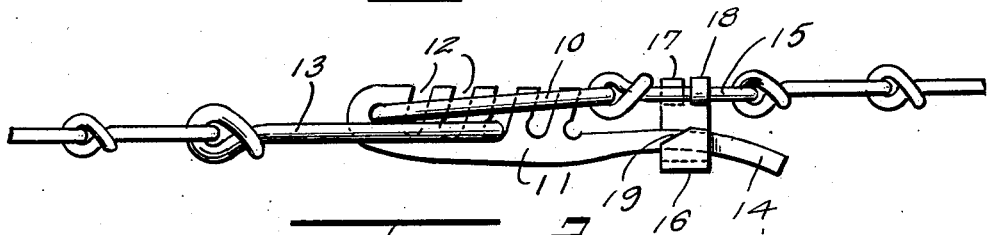
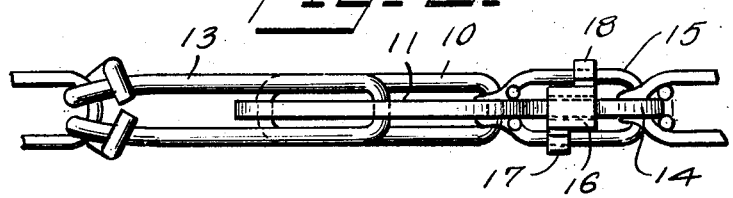
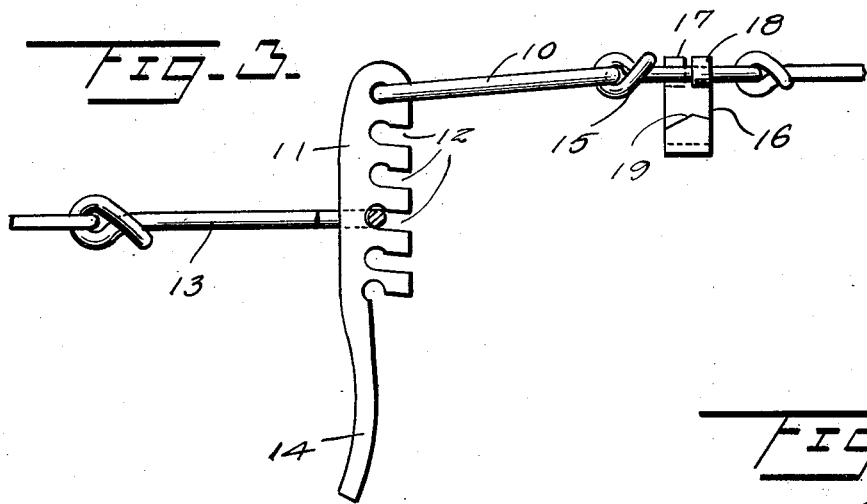
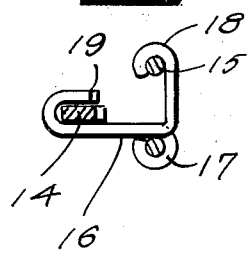
Inventor
Henry Nischke
By Watson E. Coleman
Attorney Patented Apr. 29, 1930

1,756,521

UNITED STATES PATENT OFFICE

HENRY NISCHKE, OF SOUTH MILWAUKEE, WISCONSIN, ASSIGNOR OF ONE-HALF TO ANTON HARTMANN, OF WESCOTT, WISCONSIN

CHAIN CONNECTER

Application filed July 17, 1928. Serial No. 293,328.

This invention relates to chain connecters and more particularly to a device for connecting the opposite ends of the side chains of automobile anti-skidding devices.

An important object of the invention is to provide a device of this character which will provide a relatively wide range of adjustment of the chain and which may be very readily manipulated.

A further object of the invention is to provide in a device of this character a construction such that the chain proper may carry a portion of the latching mechanism, so that while an unusual length of adjustment may be had, the actual length of the complete device does not greatly exceed that of ordinary fastening devices.

These and other objects I attain by the construction shown in the accompanying drawing, wherein for the purpose of illustration is shown a preferred embodiment of my invention and wherein:—

Figure 1 is a side elevation of a chain connecter constructed in accordance with my invention employed to connect the ends of an automobile tire chain;

Figure 2 is a plan view thereof;

Figure 3 is a view similar to that shown in Figure 1 with the connecter in partially open position;

Figure 4 is a detail sectional view showing the mounting of the clip employed for holding the lever in its locked position.

Referring now more particularly to the drawing, the numeral 10 generally designates an elongated link and the numeral 11 a locking bar pivoted to the eye at one end thereof. This locking bar has along one edge thereof a series of notches 12 for the reception of the end of a second elongated link 13 which is secured to one end of the tire chain. From the free end of the bar projects an extension 14 which is relatively narrow and has one edge thereof aligning with the un-notched edge of the bar. This extension is of such length that it projects beyond the opposite end of the link 10 and underlies an attached link 15 of the tire chain. To this link is attached a keeper 16 comprising a plate bent in J-form and having the longer arm thereof provided with oppositely extending portions 17 and 18 which are formed as eyes engaging the sides of the link 15 to support the plate. The shorter arm of the plate is preferably transversely beveled, as indicated at 19, to facilitate slipping of the extension 14 beneath the bill of the hook thus provided. The space provided between the outer surface of the eye of the extension 18 of this plate and bill of the hook is just sufficient to permit passage of the extension 14. The extension is aligned with this space after the link has been partially rotated about its longitudinal axis, the return of the link 15 to its normal position placing the extension in its position for engagement behind the bill of the keeper 16. The usual connection between the links of a chain of the character in connection with which this connecter is employed is sufficiently loose to permit of the slight rotation of the link 15 in the manner described. Since the tension of the chain will tend to prevent this oscillation of the link, it will follow that there is no possibility of the arm escaping except in response to the application of manual force.

In applying the fastener, the extension and bar are directed through the link 13 the desired distance and the link engaged in a notch, after which the arm is swung, so that the notched edge thereof is arranged at the opposite side of the link 10 from the link 13. At this time, the extension is secured, as above described.

It will be obvious that with a construction of this character, a considerable range of adjustment may be obtained and a much greater leverage provided for tensioning the chain while, at the same time, a relatively short fastener is provided.

Since the construction hereinbefore set forth is capable of a certain range of change and modification without materially departing from the spirit of the invention, I do not limit myself to such specific structure except as hereinafter claimed.

I claim:—

1. A chain fastener comprising an elongated link, a bar pivoted to one end of the link and having one edge thereof notched, the opposite end of the bar having an elongation, a chain link engaged with the opposite end of the link, and a securing clip carried by said chain link for the reception of said elongation comprising a J-shaped plate the longer arm of which is provided with oppositely directed portions the ends of which embrace the sides of the chain link.

2. A chain fastener comprising an elongated link, a bar pivoted to one end of the link and having one edge thereof notched, the opposite end of the bar having an elongation, a chain link engaged with the opposite end of the link, and a securing clip carried by said chain link for the reception of said elongation comprising a J-shaped plate the longer arm of which is provided with oppositely directed portions the ends of which embrace the sides of the chain link, the bill of the shorter arm being spaced from one of said portions a distance just sufficient to admit the elongation.

3. A chain fastener comprising an elongated link, a bar pivoted to one end of the link and having one edge thereof notched, the opposite end of the bar having an elongation, a chain link engaged with the opposite end of the link, and a securing clip carried by said chain link for the reception of said elongation comprising a plate J-shaped in edge elevation providing a long and a short arm, the long arm of which is provided with oppositely directed portions and the ends of which embrace the sides of the chain link, the portion between the arms of the clip overlying the elongation when said links are in alignment.

In testimony whereof I hereunto affix my signature.

HENRY NISCHKE.